(12) United States Patent
Albrecht et al.

(10) Patent No.: US 10,735,478 B2
(45) Date of Patent: Aug. 4, 2020

(54) CONTROLLER AND METHOD FOR SETTING UP COMMUNICATION LINKS TO REDUNDANTLY OPERATED CONTROLLERS IN AN INDUSTRIAL AUTOMATION SYSTEM

(71) Applicant: Siemens Aktiengesellschaft, Munich (DE)

(72) Inventors: Harald Albrecht, Nuremberg (DE); Ingo Landgraf, Fuerth-Poppenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 15/195,041

(22) Filed: Jun. 28, 2016

(65) Prior Publication Data

US 2017/0006072 A1 Jan. 5, 2017

(30) Foreign Application Priority Data

Jun. 30, 2015 (EP) ..................................... 15174598

(51) Int. Cl.
*H04L 29/06* (2006.01)
*H04L 29/12* (2006.01)
(Continued)

(52) U.S. Cl.
CPC .......... *H04L 65/1069* (2013.01); *G05B 17/02* (2013.01); *H04L 12/6418* (2013.01);
(Continued)

(58) Field of Classification Search
CPC .......... H04L 12/6418; H04L 29/12066; H04L 29/12594; H04L 63/0245; H04L 63/0263;
(Continued)

(56) References Cited

U.S. PATENT DOCUMENTS

2006/0164974 A1\* 7/2006 Ramalho ........... H04L 29/06027
370/219
2008/0320582 A1\* 12/2008 Chen ................... H04L 63/0245
726/12
(Continued)

FOREIGN PATENT DOCUMENTS

DE 102006027683 A1 12/2007
WO WO 2007/144364 A1 12/2007

*Primary Examiner* — Kyung H Shin
(74) *Attorney, Agent, or Firm* — Cozen O'Connor

(57) ABSTRACT

A method for setting up communication links to redundantly operated controllers in an industrial automation system, in which a first controller is in an active operating state for controlling or regulating a technical process, and a second controller is in a reserve operating state, from which it is placeable into an active operating state in the event the first controller fails, where the first/second controllers respectively store a device identifier associated with the first/second controllers, information about associations between device names and communication network addresses of the first/second controllers is provided in accordance with a name service protocol within at least one subnetwork associated with the first/second controllers, and where retrieval of a piece of address or name information for one of the two controllers involves automatically providing the piece of address or name information to setup a communication link to the other controller based on the respective device identifier.

19 Claims, 3 Drawing Sheets

(51) Int. Cl.
*H04L 29/14* (2006.01)
*H04L 12/64* (2006.01)
*G05B 17/02* (2006.01)
*H04L 12/24* (2006.01)

(52) U.S. Cl.
CPC .. *H04L 29/12066* (2013.01); *H04L 29/12594* (2013.01); *H04L 41/12* (2013.01); *H04L 61/1511* (2013.01); *H04L 61/2007* (2013.01); *H04L 63/0245* (2013.01); *H04L 63/0263* (2013.01); *H04L 69/40* (2013.01); *H04L 29/06027* (2013.01); *H04L 61/2038* (2013.01); *H04L 61/6059* (2013.01); *H04L 65/1043* (2013.01); *H04L 65/608* (2013.01)

(58) Field of Classification Search
CPC ............. H04L 63/105; H04L 29/06027; H04L 65/1043; H04L 65/608; H04L 67/14; H04L 67/02; G05B 17/02; G06F 17/5009
USPC .................................................. 709/228, 227
See application file for complete search history.

(56) References Cited

U.S. PATENT DOCUMENTS

2009/0089029 A1* 4/2009 Sturrock ................ G05B 17/02
703/7
2011/0202669 A1* 8/2011 Liang .................. H04L 12/6418
709/228

* cited by examiner

CONTROLLER AND METHOD FOR SETTING UP COMMUNICATION LINKS TO REDUNDANTLY OPERATED CONTROLLERS IN AN INDUSTRIAL AUTOMATION SYSTEM

BACKGROUND OF THE INVENTION

1. Field of the Invention

The invention relates to control and, more particularly, to a controller and method for setting up communication links to redundantly operated controllers in an industrial automation system.

2. Description of the Related Art

An industrial automation system usually comprises a multiplicity of automation devices networked to one another via an industrial communication network, and is used within the context of production or process automation for controlling or regulating installations, machines and/or devices. Time-critical constraints in technical systems automated via industrial automation systems mean that realtime communication protocols, such as PROFINET, PROFIBUS or Real Time Ethernet, are predominantly used in industrial communication networks for communication between automation devices.

Interruptions in communication links between computer units in an industrial automation system or automation devices can lead to undesirable or unnecessary repetition of a transmission of a service request. This repeated transmission causes an additional workload for communication links in the industrial automation system, which can lead to further system disturbances or faults. A particular problem in industrial automation systems regularly results from signaling traffic with a relatively large number of, albeit relatively short, messages, which intensifies the above problems.

On account of their use for often extremely different applications, Ethernet-based communication networks can encounter problems when network resources for transmitting short data frames with realtime requirements are concurrently demanded for transmitting data frames with a large user data content, for example. This can lead to delayed transmission of the data frames with realtime requirements or even to a loss of individual data frames of this kind.

WO 2007/144364 A1 describes a method for networking an automated installation that comprises at least one cell having a subnetwork. The subnetwork is linked to a further subnetwork of the automated installation via a router. The automated installation is networked by providing a multicast group that extends over both subnetworks. The multicast group is used to detect a communication network address for a communication network interface of an assembly. Here, the assembly has joined the multicast group beforehand via the communication network address, and the communication network interface has been connected to the subnetwork beforehand. The communication network address is used to assign a name to the communication network interface of the assembly. In a further step, a further communication network address for the communication network interface of the assembly is ascertained, which has at least part of a numerical representation of the name.

European patent application 14200562.8 discloses a method for ascertaining communication device addresses within a communication network in an industrial automation system. Selected communication devices of the industrial automation system each have an associated memory unit that each temporarily store at least some name service information that is provided by a communication network name service. Connection setup from a first selected communication device to a second communication device is commenced from an application or function of the industrial automation system, which application or function is distributed over at least the first and second communication devices, using the name service information that is stored in the memory unit associated with the first communication device. In the event of a failed connection setup attempt, the application or function initiates an at least partial update of the temporarily stored name service information.

A method for configuring a communication device in an industrial automation system is described in co-pending U.S. application Ser. No. 15/044,906 filed Feb. 16, 2016, the contents of which are incorporated herein by reference in its entirety. In this case, a communication network address associated with the communication device is generated independently from at least one prefix transmitted via router notification messages by at least one router allocated within a subnetwork and from a device-individual interface identifier. The communication device asks at least one server in a name service system, in accordance with a name resolution protocol, which communication network addresses are associated with its communication device name. The communication network addresses requested from the server in the name service system are checked for a match with the prefix. However, the communication device allocates itself only those communication network addresses requested from the server in the name service system that have a match with the prefix transmitted by the router.

In the case of high-availability control systems, two programmable logic controllers are logically coupled to one another such that they execute identical user programs essentially in sync. Here, one programmable logic controller, which is in an active operating state for controlling or regulating a technical process, usually has, as the main controller, a leading role, while the other programmable logic controller, as a reserve controller, executes user programs with a prescribed time delay. If one of the two programmable logic controllers in a high-availability control system fails, the remaining programmable logic controller continues to execute the user programs.

In principle, a high-availability control system is more likely in a virtual form, specifically as a result of the interaction of the two programmable logic controllers that the high-availability control system comprises. Here, the high-availability control system, in contrast to the two programmable logic controllers, has no associated device name. If, by way of example, an operator control and monitoring device is intended to access a high-availability control system, then this device usually requires setup of a respective transport connection to each of the two programmable logic controllers. Ideally, this should not require explicit identification of the two transport connections. Instead, it makes sense to set up a connection to a high-availability control system on a logical level.

In order to set up a connection to a high-availability control system, the transport connections to the two programmable logic controllers could be planned individually, in principle. This is relatively inconvenient and also susceptible to error, however. Another way of setting up a connection to a high-availability control system would be to use an additional itinerant communication network address that always refers to the current main controller. One problem with such a solution is that address changes should also be promptly updated in a Domain Name System. Usually, corresponding changes in a Domain Name System are implemented only with delays of a few minutes. A setup of a communication to a high-availability control system could, in accordance with a further alternative, also be initiated by using an additional itinerant device name that always refers to the current main controller. However, in this case, one problem is that changes in a Domain Name System are also implemented only with delays of several minutes.

SUMMARY OF THE INVENTION

In view of the foregoing, it is an object of the present invention to provide a controller and a reliable and easy-to-implement method for setting up communication links to redundantly operated controllers in a high-availability control system.

This and other objects and advantages are achieved in accordance with the invention by providing a method for setting up communication links to redundantly operated controllers in an industrial automation system, in which a first controller is in an active operating state for controlling or regulating a technical process. By contrast, a second controller is in a reserve operating state, from which it can be placed into an active operating state in the event of failure of the first controller. The first controller stores a device identifier associated with the second controller. Correspondingly, the second controller stores a device identifier associated with the first controller. The device identifiers are preferably symbolic device names. A controller in a reserve operating state preferably simulates the control or regulation of the technical process that is controlled or regulated by the controller in the active operating state. Here, a simulation can be effected with a prescribed time delay in relation to control or regulation of a technical process.

In accordance with the invention, information about associations between device names and communication network addresses of the first and second controllers is provided in accordance with a name service protocol at least within a subnetwork associated with the first or second controller. Retrieval of a piece of address or name information for one of the two controllers comprises automatically providing a piece of address or name information for setup of a communication link to the other controller based on the respective device identifier. In particular, a device identifier can be used to ascertain a communication network address for setup of a communication link, which is set up in accordance with Transmission Control Protocol, to a controller. Preferably, the respective device identifier is used to set up a communication link to the controller that is in the active operating state. This means that the user requires no knowledge of which controller in a high-availability control system is in an active operating state. Device names and addresses of both controllers can be automatically captured in a Domain Name System. As a result, development efforts and sources of error are reduced.

In accordance with a preferred embodiment of the method in accordance with the invention, the communication network addresses of the first and second controllers are IPv6 addresses. Accordingly, the first and second controllers each generate their IPv6 addresses independently. This means that there is also no need to plan the communication network addresses, as a result of which it is possible for development and startup efforts to be further reduced.

The information about associations between device names and communication network addresses of the first and second controllers can be provided in accordance with Discovery and Basic Configuration Protocol (DCP), for example, which is standardized in the context of PROFINET. Advantageously, the device identifier stored in the first controller, which device identifier is associated with the second controller, and the device identifier stored in the second controller, which device identifier is associated with the first controller, are each stored in DCP variables in accordance with Discovery and Basic Configuration Protocol. These DCP variables are provided for further automation or communication devices via corresponding service components for the Discovery and Basic Configuration Protocol.

Preferably, identification of the first controller via Discovery and Basic Configuration Protocol comprises automatically reading the DCP variable stored therein, which stores the device identifier associated with the second controller. Correspondingly, identification of the second controller by means of Discovery and Basic Configuration Protocol also comprises automatically reading the DCP variable stored therein, which stores the device identifier associated with the first controller.

In accordance with a further embodiment of the present invention, the information about associations between device names and communication network addresses of the first and second controllers is provided via a Domain Name System or in accordance with Multicast DNS protocol. Here, the device identifier stored in the first controller, which device identifier is associated with the second controller, and the device identifier stored in the second controller, which device identifier is associated with the first controller, are advantageously each stored in DNS resource records. Furthermore, the first and second controllers preferably each comprise a service component for dynamic DNS or for multicast DNS that they use to disseminate not only information about their own device name and their own communication network address but also the device identifier that is associated with the other controller. This means that besides the information about associations between device names and communication network addresses of the first and second controllers, the device identifiers can also be retrievably stored in at least one DNS server. Here, the device identifiers are advantageously stored in the DNS server as additional resource records, which are provided as additional information for an address or name resolution inquiry.

It is also an object of the invention to provide a controller in an industrial automation system which is suitable for performing the method in accordance with the disclosed embodiments and which comprises a control unit for controlling or regulating a technical process. The control unit is configured to be changed over between an active operating state and a reserve operating state. Furthermore, the controller in accordance with the invention comprises a memory unit that stores a device identifier for an associated main or reserve controller.

In accordance with the invention, the controller is configured to provide information about associations between device names and communication network addresses in accordance with a name service protocol at least within an associated subnetwork. Additionally, the controller is further configured to prompt retrieval of a piece of address or name information for a main or reserve controller to automatically provide a piece of address or name information for setup of a communication link to an associated reserve or main controller based on the respective device identifier.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
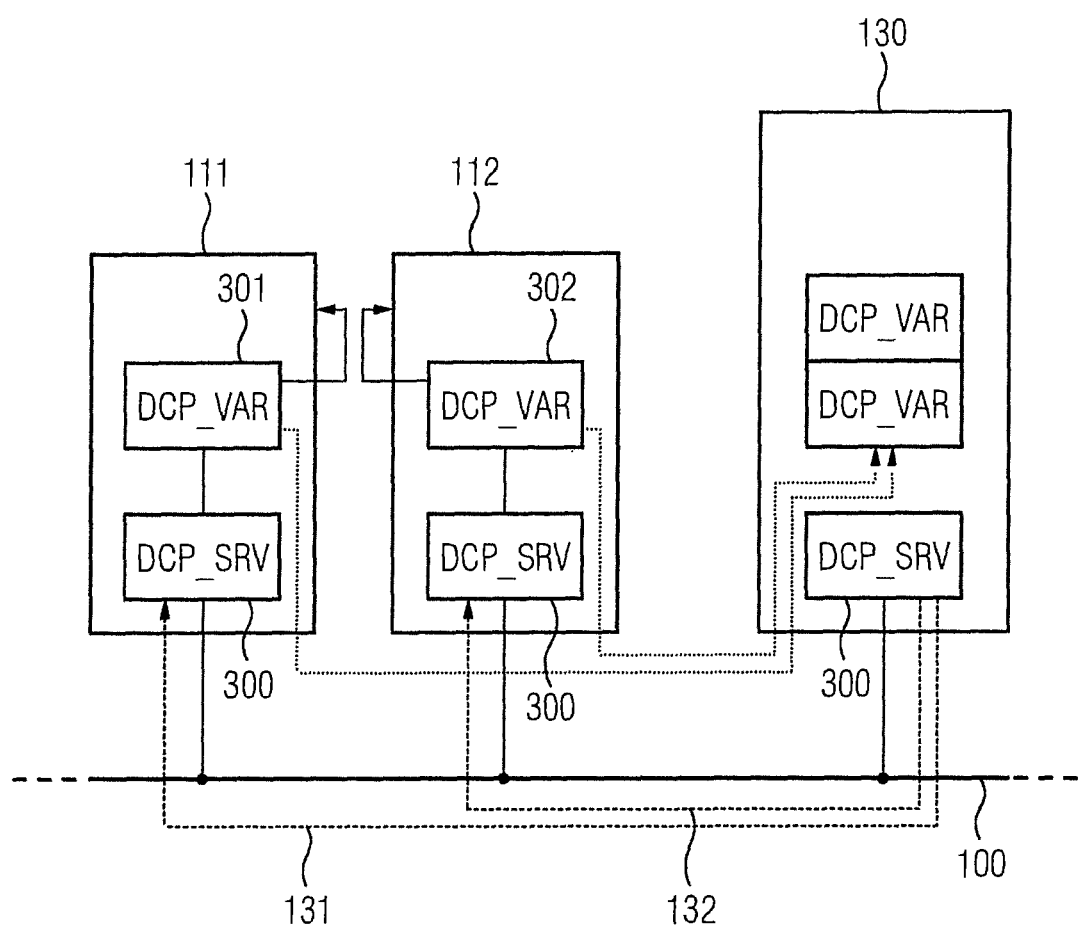
FIG. 1 shows an industrial automation system with an operator control and monitoring station and a first embodiment of a high-availability control system that comprises two redundantly operated programmable logic controllers in accordance with the invention.

The industrial automation system shown in FIG. 1 comprises an operator control and monitoring station 130 that is formed as a Human-Machine Interface (HMI) system and connected via a local area communication network 100 to a first programmable logic controller 111 and a second 112 programmable logic controller, which are operated redundantly in relation to one another and together form a high-availability control system. The two programmable logic controllers 111, 112 are configured identically and comprise a control unit (not shown in more detail in FIG. 1) for controlling or regulating a technical process. This control unit can be changed over between an active operating state and a reserve operating state. A programmable logic controller in a reserve operating state simulates the control or regulation of the technical process that is controlled or regulated by the programmable logic controller in the active operating state. In this case, a simulation is effected with a prescribed time delay or slip in relation to control or regulation of a technical process.

Furthermore, the programmable logic controllers 111, 112 each comprise a memory unit 301, 302 that stores a symbolic name for an associated main controller, which is in an active operating state, or reserve controller. In the present exemplary embodiment, the memory unit 301 of the first programmable logic controller 111 stores a symbolic name for the second programmable logic controller 112. Correspondingly, the memory unit 302 of the second programmable logic controller 112 stores a symbolic name for the first programmable logic controller 111. By way of example, the symbolic names can be written to the memory units 301, 302 in the course of development.

Both programmable logic controllers 111, 112 each provide information about associations between device names and communication network addresses in accordance with Discovery and Basic Configuration Protocol (DCP) within the local area communication network 100. To this end, the two programmable logic controllers 111, 112 each comprise a service component 300 for the Discovery and Basic Configuration Protocol. The operator control and monitoring station 130 also comprises a service component 300 for the Discovery and Basic Configuration Protocol. In the present exemplary embodiment, the communication network addresses of the first programmable logic controller 111 and second programmable logic controller 112 are IPv6 addresses that are generated by each of the first and second programmable logic controllers 111, 112 independently.

Additionally, both programmable logic controllers 111, 112 are configured to prompt retrieval of a piece of address or name information for a main or reserve controller to automatically provide a corresponding piece of address or name information to setup a communication link to an associated reserve or main controller based on the respective symbolic name. By way of example, retrieval of a piece of address or name information can be initiated by the operator control and monitoring station 130.

The first embodiment of a high-availability control system, which is shown in FIG. 1, involves the use of the Discovery and Basic Configuration Protocol for providing information about associations between device names and communication network addresses. Consequently, the symbolic names are stored in the memory units 301, 302 of the programmable logic controllers 111, 112 in respective DCP variables in accordance with Discovery and Basic Configuration Protocol. These DCP variables are provided for further automation or communication devices, such as the operator control and monitoring station 130, by corresponding service components 300 for the Discovery and Basic Configuration Protocol.

Identification of one of the two programmable logic controllers 111, 112 via Discovery and Basic Configuration Protocol comprises automatically reading the DCP variable stored therein, which stores the symbolic name of the other programmable logic controller 111, 112. When a user uses the operator control and monitoring station to select one of the two programmable logic controllers 111, 112 using a "Lifelist" or by inputting its name, for example, the operator control and monitoring station 130 automatically reads an associated reference from the respective DCP variable that refers to the other programmable logic controller 111, 112. Advantageously, this reference can be used to set up a communication link, for example, in accordance with Transmission Control Protocol, to the programmable logic controller 111, 112 that is in the active operating state, without the user needing to know which programmable logic controller is currently in the active operating state or in the reserve operating state.

Figure 2:
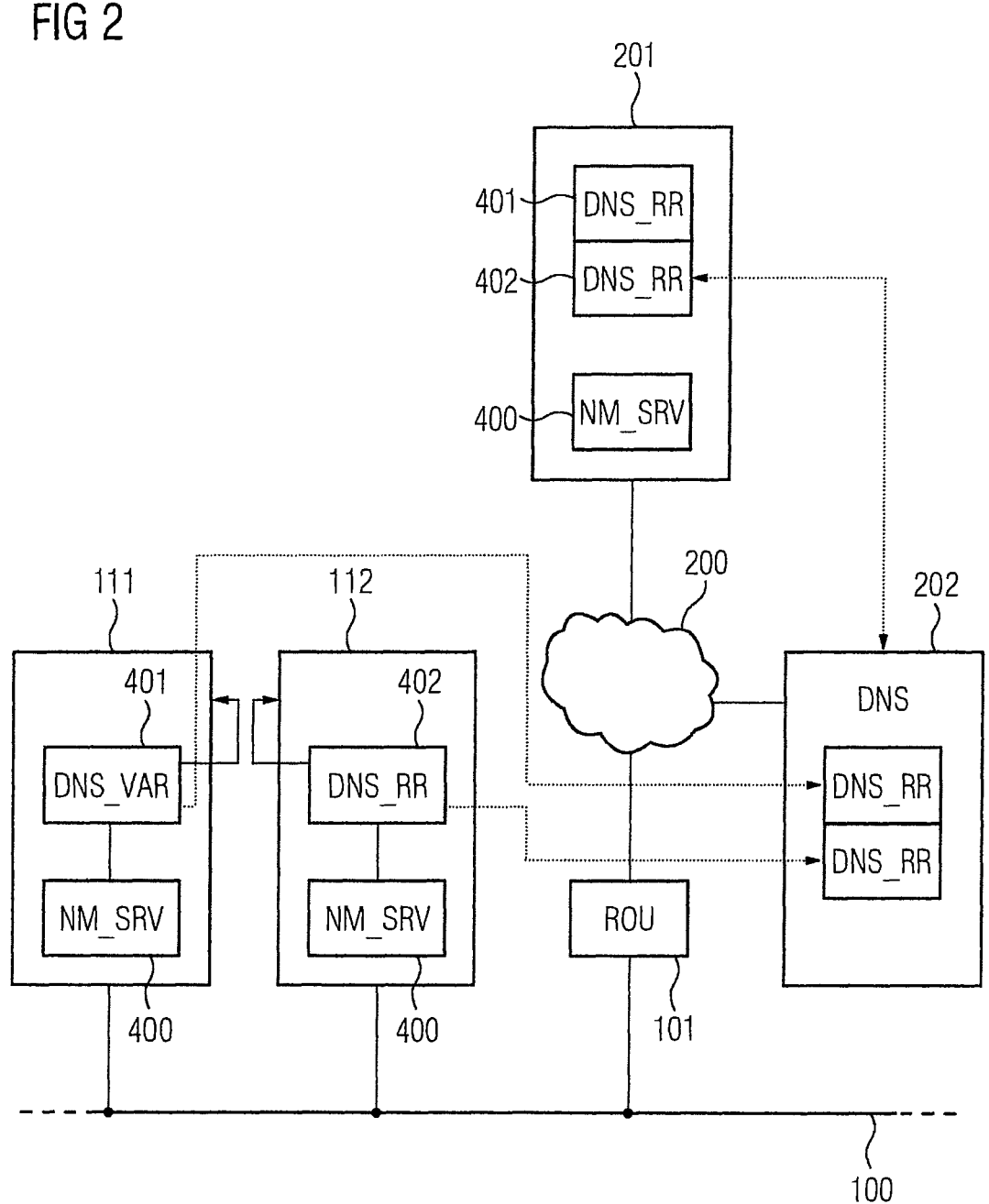
FIG. 2 shows an industrial automation system with an operator control and monitoring station and a second embodiment of a high-availability control system in accordance with the invention.

In contrast to the first embodiment of a high-availability control system, which is shown in FIG. 1, the information about associations between device names and communication network addresses of the two programmable logic controllers 111, 112 is provided, in the case of the second embodiment, shown in FIG. 2, via a Domain Name System or in accordance with Multicast DNS protocol. Furthermore, the operator control and monitoring station 201 is no longer situated in the same local area communication network 100 as the two programmable logic controllers 111, 112, but rather is now connected to the two programmable logic controllers 111, 112 via a transport network 200 and a router 101. The transport network 200 furthermore connects a Domain Name System (DNS) server 202 to both the two programmable logic controllers 111, 112 and the operator control and monitoring station 201.

In accordance with FIG. 2, both programmable logic controllers 111, 112 each have a service component 400 for dynamic DNS or multicast DNS (mDNS) that they use to disseminate not only information about their own device name and their own communication network address but also the symbolic name that is associated with the other programmable logic controller 111, 112. For this reason, the symbolic names of the other programmable logic controller 111, 112 that are stored in the memory units 401, 402 are stored as DNS resource records that, besides the information about associations between device names and communication network addresses of the two programmable logic controllers 111, 112, are initially transmitted to the DNS server 202 and retrievably stored therein. The symbolic names of the other programmable logic controller 111, 112 are thus stored in the DNS server 202 as additional resource records that are provided as additional information for an address or name resolution inquiry.

In accordance with FIG. 2, the operator control and monitoring station 201 also comprises a name service component 400 that may be formed as a standard-compliant DNS stub resolver, for example. If the operator control and monitoring station were situated in the same local area communication network 100 as the two programmable logic controllers 111, 112, then the name service component 400 of the operator control and monitoring unit 201 could be formed as an mDNS peer; the DNS server 202 would be merely optional in this case.

As soon as a user at the operator control and monitoring station 201 outside the local area communication network 100 identifies one of the two programmable logic controllers 111, 112, such as by using a domain service list or by inputting its name, the operator control and monitoring station 201 automatically reads the corresponding resource record that refers to the other programmable logic controller 111, 112. This allows automatic setup of a communication link to the respective current main controller without the latter needing to be explicitly known as such to the user of the operator control and monitoring station 201.

Figure 3:
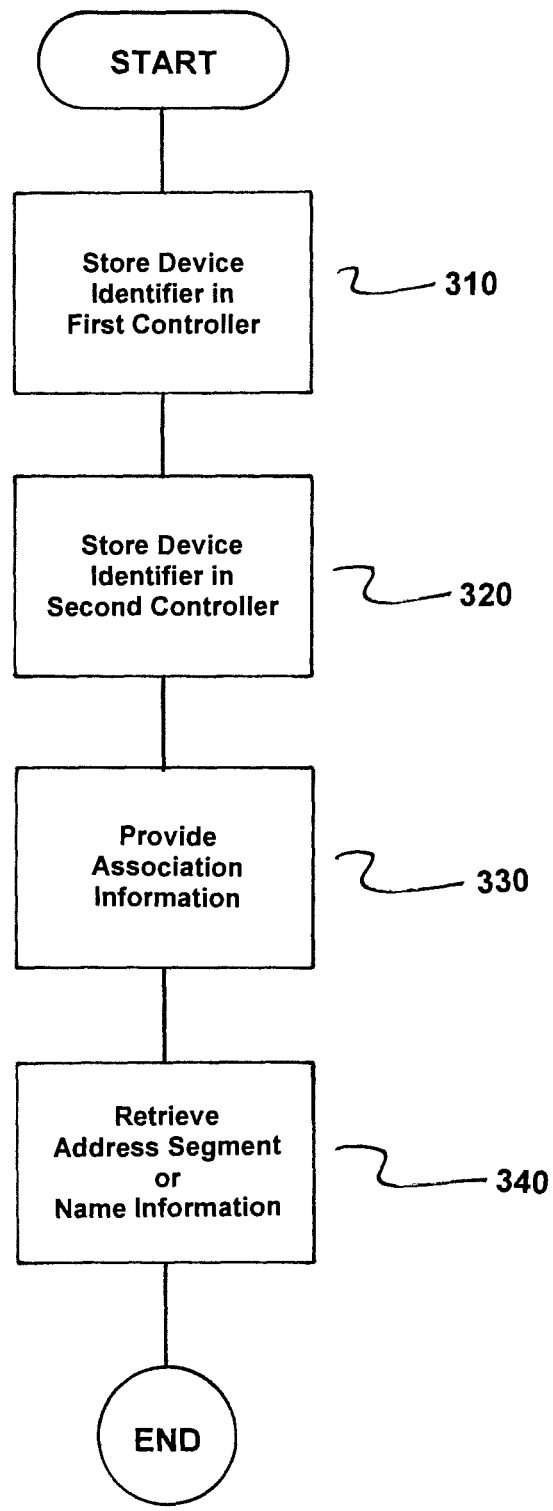
FIG. 3 is a flowchart of the method in accordance with the invention.

FIG. 3 is a flowchart of a method for setting up communication links to redundantly operated controllers in an industrial automation system, where a first controller is in an active operating state for controlling or regulating a technical process, and a second controller is in a reserve operating state, from which the second controller is placeable into an active operating state in an event of failure of the first controller. The method comprises storing a device identifier associated with the second controller in the first controller, as indicated in step 310.

Next, a device identifier associated with the first controller is stored in the second controller, as indicated in step 320.

Next, information about associations between device names and communication network addresses of the first and second controllers is provided in accordance with a name service protocol at least within a subnetwork associated with at least one of the first controller and the second controller, as indicated in step 330.

Next, a piece of address segment or name information for one of the two controllers is now retrieved to automatically provided the piece of address or name information to setup a communication link to another controller based on a respective device identifier, as indicated in step 340.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for setting up communication links to redundantly operated programmable logic controllers in an industrial automation system, wherein a first programmable logic controller is in an active operating state for controlling or regulating a technical process, and a second programmable logic controller is in a reserve operating state, from which said second programmable logic controller is placeable into an active operating state in an event of failure of the first programmable logic controller, the method comprising:

storing a device identifier associated with the second programmable logic controller in the first programmable logic controller redundantly operated in the industrial automation system;

storing a device identifier associated with the first programmable logic controller in the second programmable logic controller redundantly operated in the industrial automation system, said device identifier associated with the second programmable logic controller and the device identifier associated with the first programmable logic controller each being stored in one of a Discovery and Basic Configuration Protocol (DCP) variable and a Domain Name System (DNS) record in another corresponding programmable logic controller;

providing information about associations between device identifiers and communication network addresses of the first and second programmable logic controllers redundantly operated in the industrial automation system in accordance with a name service protocol at least within a subnetwork associated with at least one of the first programmable logic controller and the second programmable logic controller; and retrieving a piece of address segment or name information for one of the two programmable logic controllers to automatically provide the piece of address or name information of another programmable controller to setup communication links to the first and second programmable logic controllers based on respective device identifiers of the first and second programmable logic controllers;

wherein each programmable logic controller from the first and second programmable logic controllers comprises a component for disseminating information about a respective device identifier and a respective communication network address of the first and second programmable logic controllers as well as a device identifier associated with the other programmable logic controller by reading one of the DCP variable and DNS record; and wherein said retrieval of the piece of address segment or name information is effected during a user selection or identification of one of the two programmable logic controllers.

2. The method as claimed in claim 1, wherein the communication network addresses of the first and second programmable logic controllers are IPv6 addresses, and wherein the first and second programmable logic controllers redundantly operated in the industrial automation system each generate their IPv6 addresses independently.

3. The method as claimed in claim 2, wherein the information about associations between device names and communication network addresses of the first and second programmable logic controllers redundantly operated in the industrial automation system is provided in accordance with Discovery and Basic Configuration Protocol (DCP).

4. The method as claimed in claim 2, wherein the information about associations between device names and communication network addresses of the first and second programmable logic controllers redundantly operated in the industrial automation system is provided at least one of (i) via a Domain Name System (DNS) and (ii) in accordance with Multicast DNS protocol.

5. The method as claimed in claim 1, wherein the information about associations between device names and communication network addresses of the first and second programmable logic controllers redundantly operated in the industrial automation system is provided in accordance with Discovery and Basic Configuration Protocol (DCP).

6. The method as claimed in claim 5, wherein the device identifier stored in the first controller, which device identifier is associated with the second programmable logic controller, and the device identifier stored in the second programmable logic controller, which device identifier is associated with the first programmable logic controller, are each stored in DCP variables in accordance with Discovery and Basic Configuration Protocol, which are provided for further automation or communication devices via corresponding service components for the Discovery and Basic Configuration Protocol.

7. The method as claimed in claim 6, wherein identification of the first programmable logic controller via Discovery and Basic Configuration Protocol comprises automatically reading a DCP variable stored therein, which stores the device identifier associated with the second programmable logic controller, and wherein identification of the second programmable logic controller via Discovery and Basic Configuration Protocol comprises automatically reading a DCP variable stored therein, which stores the device identifier associated with the first programmable logic controller.

8. The method as claimed in claim 1, wherein the information about associations between device names and communication network addresses of the first and second programmable logic controllers redundantly operated in the industrial automation system is provided at least one of (i) via a Domain Name System (DNS) and (ii) in accordance with Multicast DNS protocol.

9. The method as claimed in claim 8, wherein the device identifier stored in the first programmable logic controller, which device identifier is associated with the second programmable logic controller, and the device identifier stored in the second programmable logic controller, which device identifier is associated with the first programmable logic controller, are each stored in Domain Name System (DNS) resource records.

10. The method as claimed in claim 9, wherein the first and second programmable logic controllers redundantly operated in the industrial automation system each comprise a service component for dynamic Domain Name System (DNS) or for multicast DNS used to disseminate information about their own device name and their own communication network address as well as the device identifier associated with the another programmable logic controller.

11. The method as claimed in claim 8, wherein the first and second programmable logic controllers redundantly operated in the industrial automation system each comprise a service component for dynamic Domain Name System (DNS) or for multicast DNS used to disseminate information about their own device name and their own communication network address as well as the device identifier associated with the another programmable logic controller.

12. The method as claimed in claim 11, wherein the device identifiers are retrievably stored in at least one Domain Name System (DNS) server along with the information about associations between device names and communication network addresses of the first and second controllers programmable logic redundantly operated in the industrial automation system.

13. The method as claimed in claim 12, wherein the device identifiers are stored in the DNS server as additional resource records which are provided as additional information for an address or name resolution inquiry.

14. The method as claimed in claim 1, wherein the device identifiers are symbolic device names.

15. The method as claimed in claim 1, wherein a device identifier is utilized to ascertain a communication network address to setup a communication link to a programmable logic controller, and wherein the communication link is set up in accordance with Transmission Control Protocol.

16. The method as claimed in claim 1, wherein a respective device identifier is utilized to set up a communication link to a controller that is in the active operating state.

17. The method as claimed in claim 1, wherein a programmable logic controller in a reserve operating state simulates the control or regulation of the technical process that is controlled or regulated by the programmable logic controller in the active operating state.

18. The method as claimed in claim 17, wherein a simulation is effected with a prescribed time delay in relation to control or regulation of the technical process.

19. A redundantly operated programmable logic controller in an industrial automation system, said programmable logic controller comprising:
a control unit for controlling or regulating a technical process, the control unit of the redundantly operated industrial automation system being configured to be changed over between an active operating state and a reserve operating state;
a memory unit which stores a device identifier for an associated main or reserve controller in one of a Discovery and Basic Configuration Protocol (DCP) variable and a Domain Name System (DNS) record;
a component for disseminating information about the device identifier and a communication network address of the programmable logic controller as well as a the device identifier associated with another programmable logic controller by reading one of the DCP variable and the DNS record of the programmable logic controller;
wherein the programmable logic controller of the redundantly operated automation system is further configured to provide information about associations between device identifiers and communication network addresses in accordance with a name service protocol at least within an associated subnetwork;
wherein the programmable logic controller of the redundantly operated automation system is additionally configured to prompt retrieval of a piece of address or name information of the other programmable controller for a main or reserve programmable logic controller to automatically provide the piece of address or name information for setup of a communication link to an associated reserve or main programmable logic controller based on a respective device identifier of the reserve or main programmable logic controller; and wherein said retrieval of the piece of address segment or name information is effected during a user selection or identification of one of the two programmable logic controllers.

\* \* \* \* \*